US006456479B1

(12) United States Patent
Dias

(10) Patent No.: US 6,456,479 B1
(45) **Date of Patent: *Sep. 24, 2002**

(54) KEYCODE CONNECTION ARRANGEMENT BETWEEN A PROCESSING MODULE AND A TERMINAL BLOCK

(75) Inventor: Clive Dias, Pickering (CA)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/506,435

(22) Filed: Feb. 18, 2000

(51) Int. Cl.[7] .......... H02H 9/00

(52) U.S. Cl. .......... 361/119; 361/111; 361/115

(58) Field of Search .......... 361/119, 124, 361/127, 58, 111, 113, 115

(56) References Cited

U.S. PATENT DOCUMENTS

| | | | | |
|---|---|---|---|---|
| 4,872,855 A | | 10/1989 | Norden | |
| 4,940,423 A | | 7/1990 | Aihara et al. | 439/369 |
| 5,568,348 A | | 10/1996 | Foreman et al. | 361/118 |
| 5,775,955 A | | 7/1998 | Graube et al. | 439/717 |
| 5,873,753 A | | 2/1999 | Norris, Jr. et al. | 439/752 |
| 5,999,394 A | * | 12/1999 | Dias | 361/119 |

OTHER PUBLICATIONS

PCT International Search Report dated Jul. 17, 2001 Internaional Application No. PCT/US01/05299.

* cited by examiner

*Primary Examiner*—Stephen W. Jackson
(74) *Attorney, Agent, or Firm*—Karl Vick; Kevin Duncan; Hunton & Williams

(57) ABSTRACT

A connection assembly for facilitating connection between a terminal block and a module containing protective relay circuitry. The assembly includes a keycode plate molded to align with and fit over terminal block connection elements extending through openings provided in the keycode plate. The assembly also includes one or more keycode elements fitting into keycode element reception areas provided in the keycode plate, and a module cover having pre-existing slots located and dimensioned so as to align with and receive corresponding keycode elements. The assembly substantially ensures that the correct module is connected to a correct terminal block and substantially prevents an incorrect module from being connected to an incorrect terminal block.

18 Claims, 5 Drawing Sheets

KEYCODE CONNECTION ARRANGEMENT BETWEEN A PROCESSING MODULE AND A TERMINAL BLOCK

BACKGROUND OF THE INVENTION

The present invention relates generally to connections between modular elements. More particularly, the present invention relates to connection assemblies which facilitate the connection of a module containing processing circuitry with a terminal block, such as a module of a digital protective relay and a terminal block connectable to a power distribution network.

In U.S. Pat. No. 5,999,394, a terminal block assembly for a protective relay is disclosed which advantageously provides a reliable connection between the protective relay and an associated power distribution network. The terminal block assembly provides greatly enhanced accessibility, and allows a wide variety of connection schemes between the circuitry of the protective relay and the terminal block.

When a wide variety of connection schemes are possible, such as when the relay processing circuitry consists of any combination of independent, separately removable and replaceable special purpose processing modules, it is desirable to ensure that the proper terminal block is connected to a proper relay processing module.

In the example of a protective relay having relay processing circuitry embodied by multiple replaceable modules, each of which connects to a terminal block, serious problems can result from a module being installed with an incorrect orientation (e.g., upside down), or being installed and connected to the wrong terminal block. These problems can range from damage to the module to physical harm to the installer or other associated with the power distribution network.

To aid in installing modules, one approach is to provide each module 10 with a card pull or ejector 12 (see FIG. 1) which are rotatably connected to the module. By applying pressure to the card pulls, the module can be inserted or removed more easily; more particularly, the module connectors can be urged past the shorting fingers of the terminal block. As described in Applicant's U.S. Pat. No. 5,999,394, the terminal block has shorting fingers which, for safety purposes, are connected together in pairs when no module is connected to the terminal block, and are separated when a module is inserted. While the card pulls can be made of plastic, plastic does not typically provide sufficient strength for the card pulls. Thus, plastic card pulls tend to break in use. Card pulls can be made durable by using die cast metal; however, the strength of the metal card pulls can facilitate an improper connection, as the installer can easily provide sufficient force to break any alignment aids which may be contained at the rear of the module, on the terminal block, or within the relay cavity.

Accordingly, it would be desirable to provide a connection assembly for aligning and connecting processing circuitry, particularly that of a modular digital protective relay, and a properly-corresponding terminal block assembly.

BRIEF SUMMARY OF THE INVENTION

The present invention overcomes the problems noted above, and achieves additional advantages, by providing for a connection assembly, and connection elements, for facilitating connection between a terminal block and a module containing processing circuitry. According to exemplary embodiments, the connection assembly can include a keycode plate and keycode connection elements. The keycode plate is molded to align with and fit over terminal block connection elements, the terminal block connection elements extending through openings provided in the keycode plate. The keycode elements at one end fit into slots provided in the keycode plate, and the keycode elements at another end fit into pre-existing recesses on a module cover. The recesses are provided in locations on the module or module cover so as to align with and receive corresponding keycode elements, thereby substantially ensuring the correct module is connected to a correct terminal block and that an incorrect module is substantially prevented from connection to an incorrect terminal block. Blocking elements can be placed at appropriate locations to prevent the connection of improperly matched modules and terminal blocks.

The assembly, keycode plate, and module cover of the present invention can substantially ensure proper alignment and mating of a relay processing module and a terminal block, or other similar components.

BRIEF DESCRIPTION OF THE DRAWINGS

The features and advantages of the present invention can be more fully understood by reading the following Detailed Description of presently preferred embodiments in connection with the accompanying drawings, in which like reference indicators designate like elements, and in which.

DETAILED DESCRIPTION OF THE INVENTION

Figure 2:
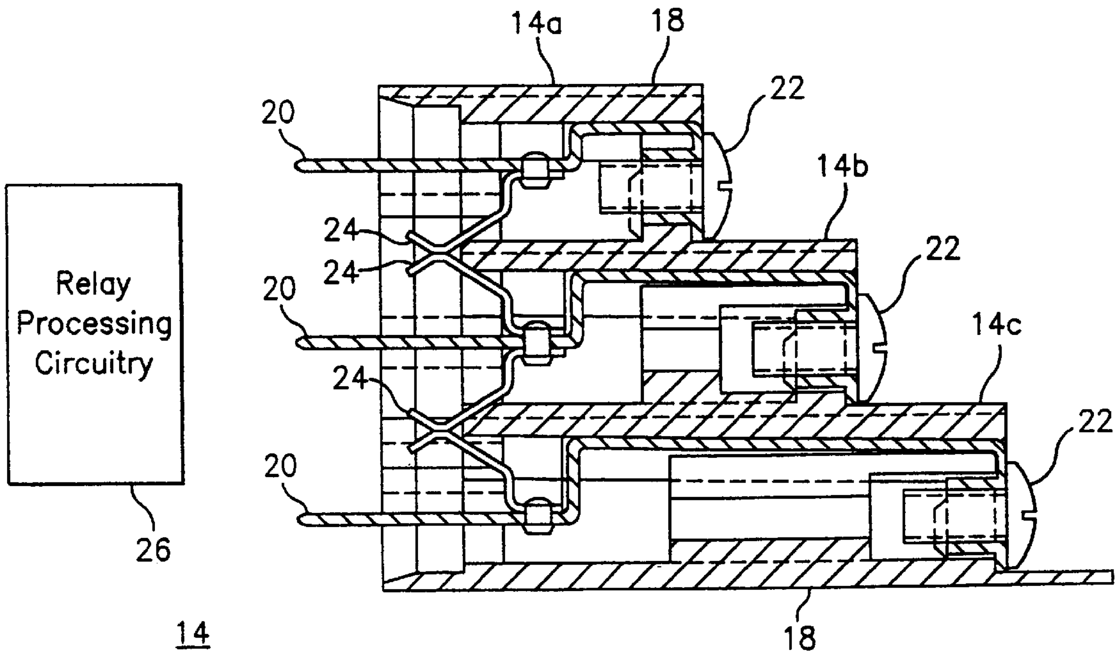
FIG. 2 is a diagram of a terminal block and a module intended for connection to the terminal block.

Referring now to FIG. 2, a diagram of a terminal block and a module to be connected to the terminal block are shown. The terminal block 20 has connectors 22 which are receivable in corresponding ones of a plurality of receiving slots of the module 24 to provide an electrical and mechanical connection. For purposes of explanation, it is assumed that module 24 is a module of a digital protective relay, and accordingly contains processing circuitry for a protective relay. In other words, the module 24 can be a central processing unit, a digital signal processor, or some other general or special purpose module which can be removable and replaceable in the housing of a digital protective relay. The digital relay housing might include multiple terminal blocks 20 which connect at a first end, as shown in FIG. 2, to a module, and at a second end to a power distribution system.

Figure 1:
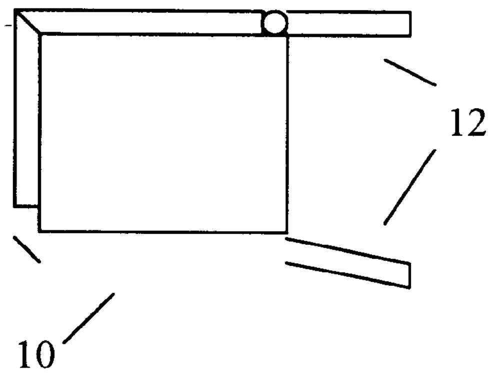
FIG. 1 is a diagram of a module containing processing circuitry and having card pulls, the module suitable for connection to a terminal block.
Figure 3:
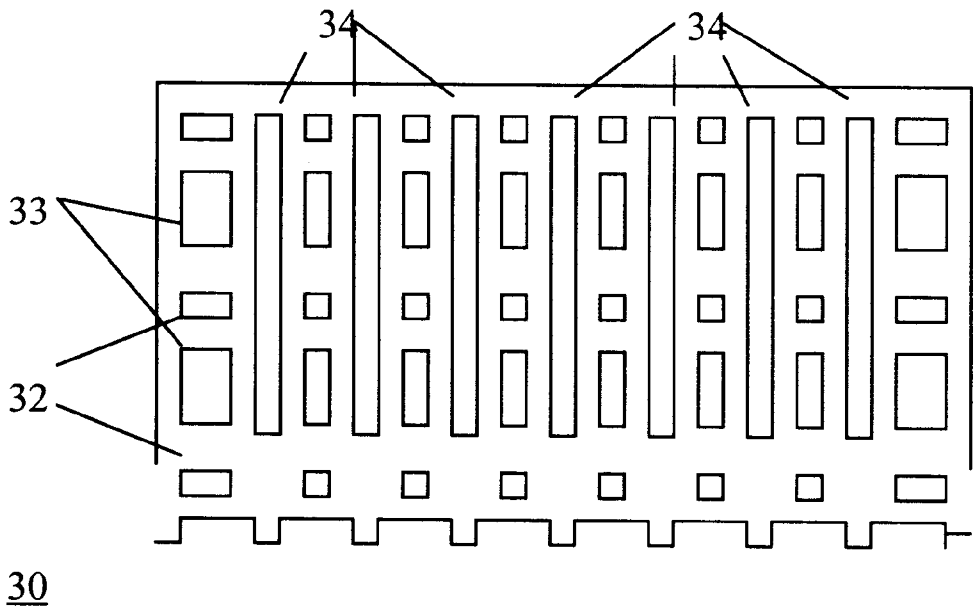
FIG. 3 is a diagram of one face of a keycode plate according to an embodiment of the present invention.

Referring now to FIG. 3, a diagram of one face of a keycode plate according to an embodiment of the present invention is shown. The keycode plate 30 is provided with openings 32 through which terminal block connection elements (not shown, but which are metal elements extending from a terminal block and which are received in a module) can extend. The keycode plate 30 is further provided with slots or openings 34 into which male keycode elements can be inserted. The slots or openings 34 can be holes through the keycode plate, or can be formed by a groove or other area of reduced thickness of the keycode plate 30. According to one preferred embodiment, the slots or openings 34 are defined by a groove extending vertically (in the orientation of FIG. 3) for substantially the entire vertical width of the keycode plate 30, where the groove is provided with apertures constituting the slots or openings 34. Tabs on the male keycode elements (to be explained in more detail below) are received in the apertures 34. As shown in FIG. 3, the apertures can be spaced to accommodate two types of keycode elements; that is, a first row of apertures 36 is provided across one half of the keycode plate, each of which is dimensioned to receive a keycode element having a single tab, and a second set of apertures 38 is provided across a bottom half of the keycode plate, which are arranged and dimensioned to receive a keycode element having two tabs. While this accommodation of multiple types of keycode elements adds some complexity to the keying process, it also advantageously provides more keying combinations and can result in more accurate keying. The keycode plate 30 can be made of plastic, and can be molded to align with and fit over the terminal block. It will be appreciated that the keycode plate can include additional slots or openings. Preferably, for ease of manufacturing and to make the keycode plate adaptable to a wide variety of configurations, each keycode plate can be manufactured with the same number of openings 32 and slots or openings 34.

Figure 4:
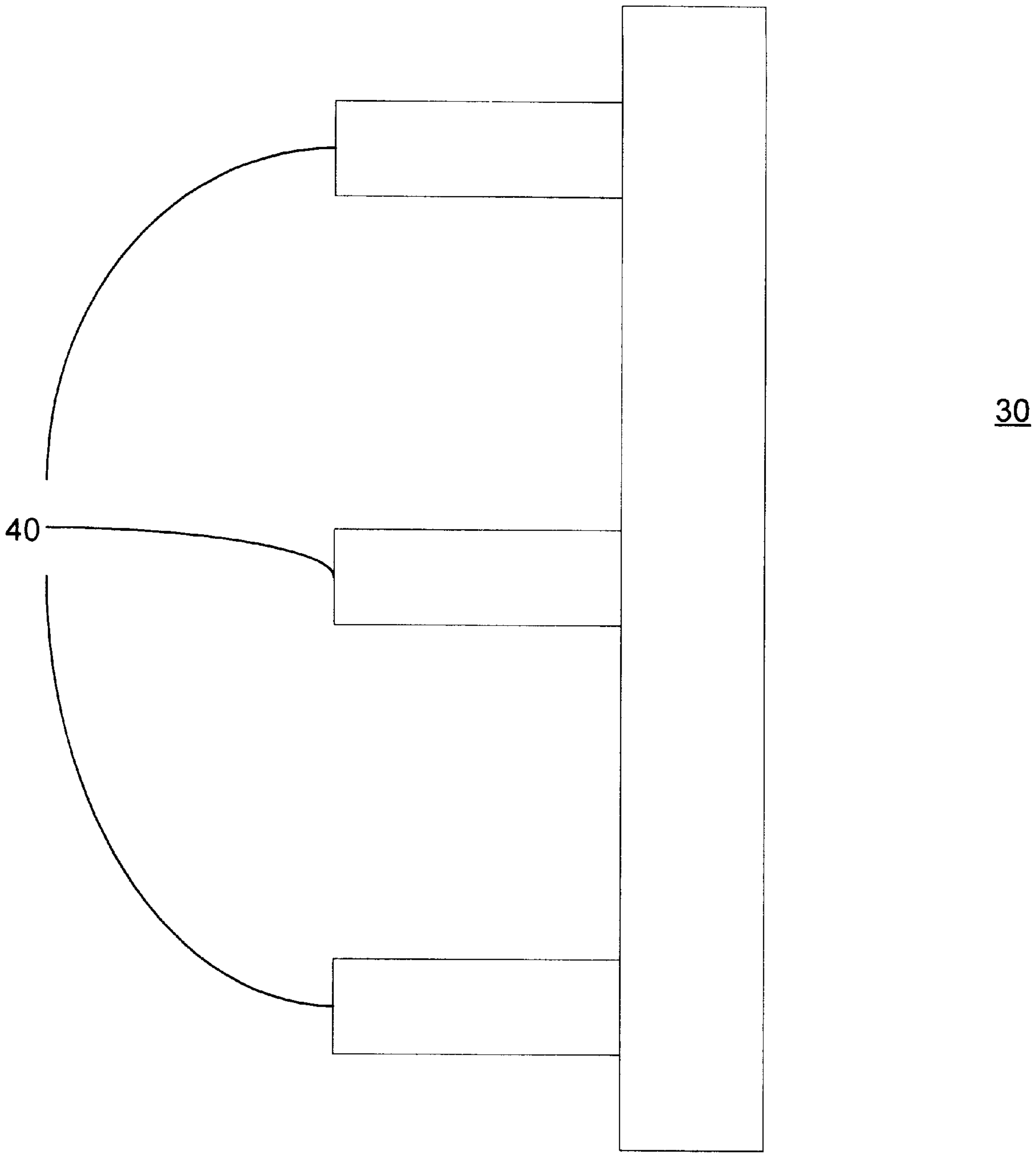
FIG. 4 is a cross-sectional view of the keycode plate of FIG. 3.

Referring now to FIG. 4, a cross-sectional view of the keycode plate of FIG. 3 is shown. It can be seen in FIG. 4 that the keycode plate is provided with (in this example, three rows of) extension elements 40. These extension elements are received into corresponding holes (not shown) provided in the terminal block. The extension elements 40 improve alignment between the keycode plate and the terminal block, especially if the openings 32 are dimension slightly larger than necessary to accommodate the connection elements of the terminal block. According to one embodiment, extension elements 40 are approximately 0.38 inches in length, 0.109 inches in diameter, and are spaced approximately 0.515 inches apart on the keycode plate. According to the same embodiment, the keycode plate 30 is approximately 0.38 inches thick.

Figure 5:
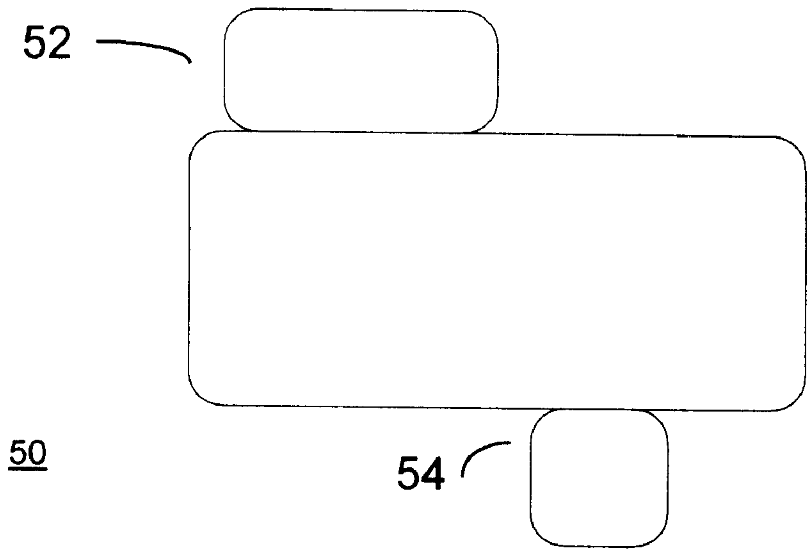
FIG. 5 is a diagram of a first keycode element in accordance with an embodiment of the present invention.
Figure 6:
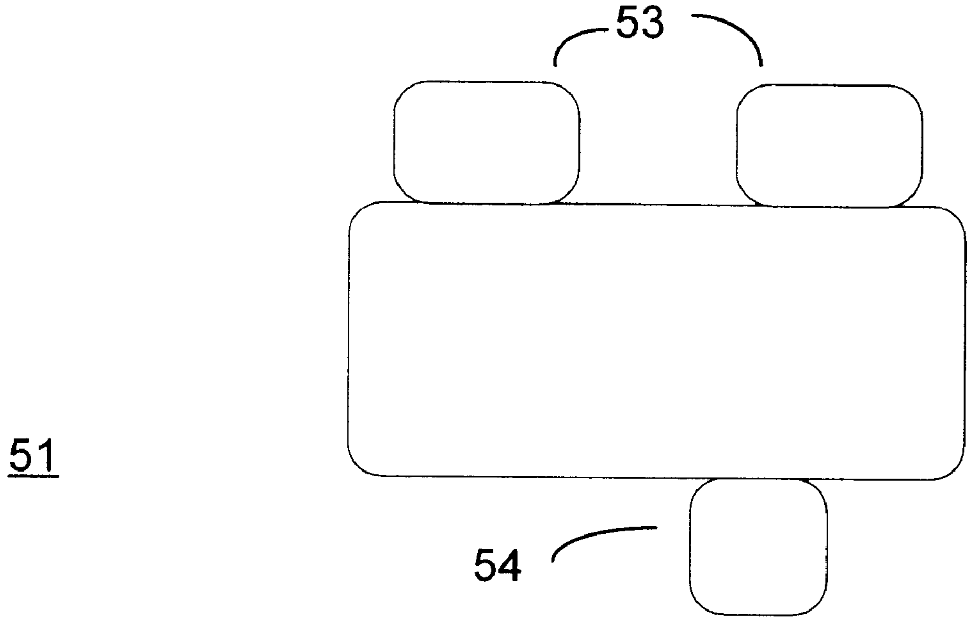
FIG. 6 is a diagram of a second keycode element in accordance with an embodiment of the present invention.

Referring now to FIG. 5, a diagram of a first male keycode element 50 is shown. The male keycode element 50 is dimensioned to fit appropriately within the groove, if present, and the slots 34 of the keycode plate 30. The keycode element 50 can advantageously be provided with an extension portion 52 that can be received in the slots 34 to more securely seat the keycode element 50 in the keycode plate. The male keycode element 50 can further advantageously include a tab 54 which can be received in an appropriate gap or groove in the cover of a module to better align with the module and to be held more securely. As described above, the keycode elements can be provided with multiple extension portions, and one example of this is shown in FIG. 6, where a keycode element 51 is provided with two extension portions 53 having different (in this case, smaller) dimensions than the extension portion 52 of keycode element 50. Like the keycode plate 30, the male keycode elements 50 can be made of molded plastic or other suitable material. In use, a plurality of male keycode elements 50 and 51 are inserted into a corresponding plurality of slots or openings 34 in a keycode plate 30. The male keycode elements 50 and 51 preferably correspond in number and location to a plurality of receiving portions located on the module or on the protective relay; however, it will be appreciated that there may be more receiving portions than male keycode elements.

Figure 7:
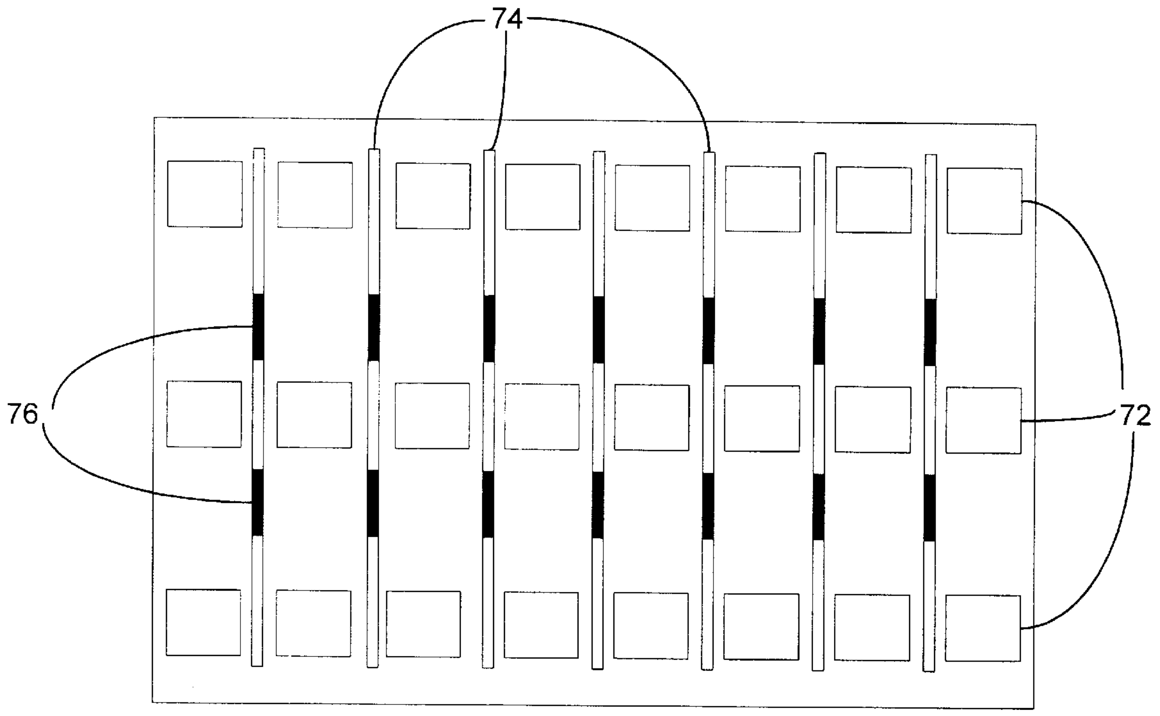
FIG. 7 is a diagram showing a cover of a protective relay module suitable for use in an embodiment of the present invention.

Referring now to FIG. 7, and end view of a cover 70 of a module contained in a protective relay is shown. The module contains processing circuitry (e.g., digital I/O circuitry, a central processing unit, etc.) for carrying out or supporting the protective control functions of a protective relay. The cover 70 of the module is provided with a plurality of receiving holes 72, through which terminal block connection elements can extend for mechanical and electrical connection of a terminal block and a module. The cover of the module 70 further include a plurality of holes or recesses 74, each of which are shaped and dimensioned to receive either of a male keycode element 50 and 51 or a blocking element (to be described in more detail below). In this example, the recesses 74 are formed as grooves oriented perpendicularly to the receiving holes 72. The grooves extend substantially across the module cover 70. Further, within the grooves are provided recessed portions 76 which are located and dimensioned to receive and hold a tab 54 of a keycode element 50 and 51. Thus, the grooves can receive and hold blocking elements (to be described in more detail below) or a keycode element 50 and 51 and any associated tabs 54.

It should be appreciated that the cover 70 that contains the receiving holes 72 and the holes or recesses 74 is effectively a second keycode plate that, unlike the first keycode plate 30, is shaped and dimensioned to fit onto a module rather than onto a terminal block. In one embodiment, the cover 70 can be provided with extension portions (not shown) having hooked or notched ends, the extension portions being insertable into a module and the hooked or notched ends mating with holes provided in the module to securely hold the cover on the module.

Alternatively, a female keycode element, or seating element of, e.g., plastic, rubber, or other suitable material can be inserted into the holes or recesses 74, the seating element designed to receive either a keycode element 50 and 51 (along with any associated tab) or a blocking element.

Figure 8:
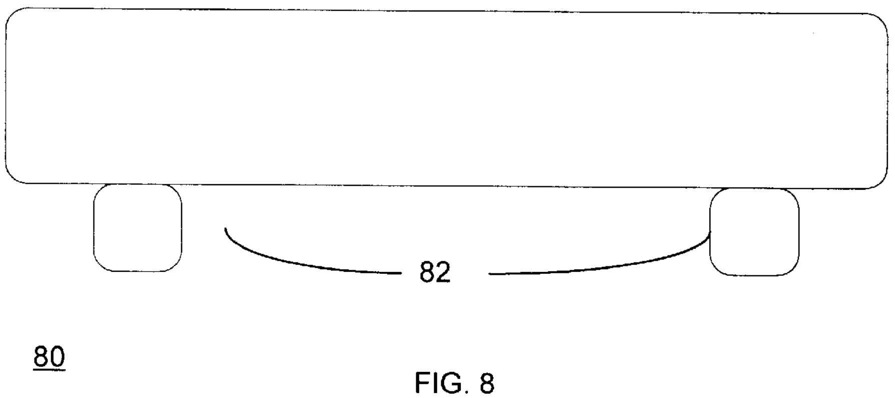
FIG. 8 is a side view of a blocking element suitable for use in an embodiment of the present invention.

Referring now to FIG. 8, a side view diagram of a blocking element 80 is shown. The blocking element 80 is sized, shaped, and dimensioned to fit into the holes or recesses 74 shown and described with respect to FIG. 7. Preferably, the blocking element 80 is provided with nubs 82 to ensure that the blocking element is held securely in the holes or recesses 74 so as to effectively prevent an incorrect terminal block to be connected to an incorrect module. The blocking element 80 can be made of plastic or other suitable material. In use, a plurality of blocking elements 80 are inserted into the holes or recesses 74 which are not to receive a male keycode element, thus substantially preventing an incorrect terminal block to be connected to an incorrect module.

The embodiments described above can be enhanced by making the male keycode elements 50 optically distinct from the keycode plate 30, and by making the blocking elements similarly optically distinct from the keycode plate 30. For example, in one embodiment, the keycode elements and blocking elements are made white, while the keycode plate, terminal block housing, and module housing are black. Such an enhancement advantageously aids in alignment.

While the foregoing description includes many details and specificities, it is to be understood that these do not constitute limitations of the present invention. The exemplary embodiments described above can be varied in numerous ways without departing from the scope of the invention, which is defined by the following claims and their legal equivalents.

What is claimed is:

1. A connection assembly for facilitating connection between a terminal block and a module, the module containing protective relay circuitry, the assembly comprising:

a keycode plate, molded to align with and fit over terminal block connection elements, the terminal block connection elements extending through openings provided in the keycode plate;

one or more keycode elements, the keycode elements fitting into keycode element reception areas provided in the keycode plate;

a module cover having pre-existing slots located and dimensioned so as to align with and receive corresponding keycode elements, thereby substantially ensuring the correct module is connected to a correct terminal block and that an incorrect module is substantially prevented from connection to an incorrect terminal block.

2. The assembly of claim 1, wherein one or more of the pre-existing slots are provided with blocking elements to substantially prevent insertion of a keycode element.

3. The assembly of claim 1, wherein the keycode plate is made of molded plastic.

4. The assembly of claim 1, wherein the keycode elements and blocking elements are made of molded plastic.

5. The assembly of claim 1, wherein the keycode elements and blocking elements are optically distinct from at least one of the keycode plate, the terminal block, and the module.

6. The assembly of claim 1, wherein the keycode plate can receive fourteen keycode elements.

7. An insert for connection of a terminal block of a protective relay to a module, comprising:

a keycode plate, the keycode plate aligning with and fitting over connection elements of the terminal block, the connection elements extending through a first plurality of slots provided in the keycode plate;

at least one keycode element, at least one of the keycode elements fitting into a second plurality of slots provided in the keycode plate; and a cover, which is associated with the module, having a corresponding receiving portion, at least one of the keycode elements aligning with and fitting into the corresponding receiving portion of the cover.

8. The insert of claim 7, wherein the cover is a cover of a relay processing module.

9. The insert of claim 7, wherein the keycode plate and the at least one keycode element are optically distinct.

10. The insert of claim 7, wherein the keycode plate and the at least one keycode element are made of molded plastic.

11. The insert of claim 7, wherein the keycode plate can receive and hold fourteen keycode elements.

12. The insert of claim 7, wherein the second plurality of slots include at least one first type of slot for receiving a first type of keycode element, and at least one second type of slot for receiving a second type of keycode element.

13. The insert of claim 12, wherein the first type of slot includes a single aperture through the keycode plate, the first type of keycode element includes a single tab which is received and held in the single aperture, the second type of slot includes multiple apertures through the keycode plate, and the second type of keycode element includes multiple tabs which are received and held in the multiple apertures.

14. The insert of claim 7, wherein the keycode plate further includes a plurality of extension elements positioned to extend into corresponding receiving holes provided in the terminal block.

15. The insert of claim 7, wherein the at least one keycode element includes at least one extension portion which is insertable into a corresponding depressed portion in the corresponding receiving portion.

16. A connection assembly for connecting a module containing processing circuitry and a corresponding terminal block having connection elements, the connection assembly comprising:

a cover of the module having a plurality of receiving holes through which processing circuitry connection elements can extend, the cover having one or more recesses located between the receiving holes, each recess dimensioned to receive one of a blocking element and a corresponding keycode element;

a keycode plate, the keycode plate aligning with and fitting over the connection elements of the terminal block, the connection elements extending through a first plurality of slots provided in the keycode plate; and a plurality of keycode elements, at least one keycode element fitting into a second plurality of slots provided in the keycode plate, and wherein each keycode element fitting into a recess of the cover.

17. The connection assembly of claim 16, wherein the cover is optically distinct from the blocking element and the keycode element.

18. The connection assembly of claim 16, wherein the recesses are provided with internal recessed portions dimensioned to receive a tab portion provided on the terminal block connection element.

* * * * *